United States Patent
Hwang et al.

(10) Patent No.: US 12,533,083 B2
(45) Date of Patent: Jan. 27, 2026

(54) TRANSIENT BIO-ADHESIVE DEVICE FOR ORGAN MONITORING

(71) Applicants: POSTECH RESEARCH AND BUSINESS DEVELOPMENT FOUNDATION, Pohang-si (KR); IUCF-HYU (Industry-University Cooperation Foundation Hanyang University), Seoul (KR); Research & Business Foundation SUNGKYUNKWAN UNIVERSITY, Suwon-si (KR)

(72) Inventors: Dong Soo Hwang, Pohang-si (KR); Hyung Joon Cha, Pohang-si (KR); Tae Il Kim, Pyeongtaek-si (KR); Jung Ki Jo, Seoul (KR)

(73) Assignees: POSTECH RESEARCH AND BUSINESS DEVELOPMENT FOUNDATION, Pohang-si (KR); IUCF-HYU (INDUSTRY-UNIVERSITY COOPERATION FOUNDATION HANYANG UNIVERSITY), Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 386 days.

(21) Appl. No.: 18/338,491

(22) Filed: Jun. 21, 2023

(65) Prior Publication Data
US 2024/0090840 A1 Mar. 21, 2024

(30) Foreign Application Priority Data
Jun. 21, 2022 (KR) .......................... 10-2022-0075645

(51) Int. Cl.
*A61B 5/00* (2006.01)
*A61B 5/07* (2006.01)
(Continued)

(52) U.S. Cl.
CPC .............. *A61B 5/686* (2013.01); *A61B 5/076* (2013.01); *A61L 24/0005* (2013.01);
(Continued)

(58) Field of Classification Search
CPC ..... A61B 5/686; A61B 5/076; A61L 24/0005; A61L 24/046; A61L 31/005;
(Continued)

(56) References Cited

U.S. PATENT DOCUMENTS

2008/0109017 A1* 5/2008 Herweck ............... A61F 2/0063
606/151
2013/0140649 A1* 6/2013 Rogers ................... B82Y 10/00
438/48
(Continued)

FOREIGN PATENT DOCUMENTS

JP 2015-093167 5/2015
KR 10-2019-0058776 5/2019
(Continued)

OTHER PUBLICATIONS

Curry et al., Biodegradable Piezoelectric Force Sensor, Proc. Natl. Acad. Sci. U.S.A. 115 (5) 909-914, https://doi.org/10.1073/pnas1710874115 (2018 (Year: 2018).*
(Continued)

*Primary Examiner* — Mark Edwards
(74) *Attorney, Agent, or Firm* — LEX IP MEISTER, PLLC

(57) ABSTRACT

Provided is a bio-adhesive device including an adhesive material layer, an electronic device layer, and a protective film layer to have advantages of being harmless to the
(Continued)

human body, being naturally degraded in the body without a separate removal process, and capable of observing the movement of internal organs more closely in real time from outside the body.

20 Claims, 11 Drawing Sheets

Specification includes a Sequence Listing.

(51) Int. Cl.
*A61L 24/00* (2006.01)
*A61L 24/04* (2006.01)
*A61L 31/00* (2006.01)
*A61L 31/02* (2006.01)
*A61L 31/04* (2006.01)
*A61L 31/08* (2006.01)
*A61L 31/16* (2006.01)

(52) U.S. Cl.
CPC ........... *A61L 24/046* (2013.01); *A61L 31/005* (2013.01); *A61L 31/022* (2013.01); *A61L 31/048* (2013.01); *A61L 31/088* (2013.01); *A61L 31/16* (2013.01); *A61L 2300/424* (2013.01); *A61L 2400/12* (2013.01)

(58) Field of Classification Search
CPC .... A61L 31/022; A61L 31/048; A61L 31/088; A61L 2300/424; A61L 2400/12

USPC ........................................................ 600/302
See application file for complete search history.

(56) References Cited

U.S. PATENT DOCUMENTS

| 2016/0038632 | A1* | 2/2016 | Shah ..................... A61L 27/18 514/8.1 |
| 2016/0050750 | A1* | 2/2016 | Rogers ................... H05K 3/285 361/767 |
| 2021/0087237 | A1* | 3/2021 | Hauf ................ C07K 14/43504 |
| 2021/0369152 | A1* | 12/2021 | Hurtz ................. A61B 5/14532 |

FOREIGN PATENT DOCUMENTS

| KR | 10-2019-0132381 | 11/2019 |
| KR | 10-2021-0028130 | 3/2021 |
| KR | 10-2368595 | 2/2022 |

OTHER PUBLICATIONS

Jiang et al. "Antifouling Strategies for Selective In Vitro and In Vivo Sensing" Chem. Rev. 2020, 120, 8, 3852-3889 retrieved Sep. 10, 2025 at https://doi.org/10.1021/acs.chemrev.9b00739 (Year: 2020).*
Jung et al. (Nano-Cracked Strain Sensor with High Sensitivity and Linearity by Controlling the Crack Arrangement. Sensors (Basel). Jun. 25, 2019;19(12):2834. doi: 10.3390/s19122834 (Year: 2019).*

* cited by examiner

[FIG. 1]
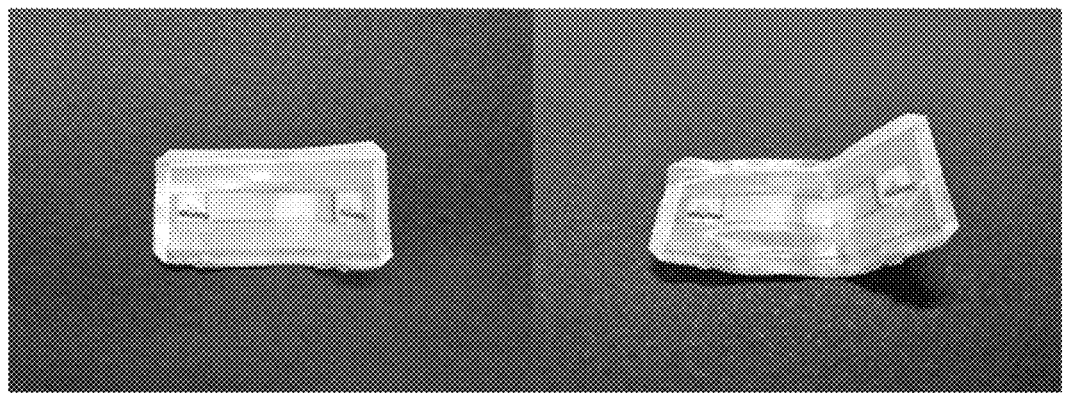
[FIG. 2]
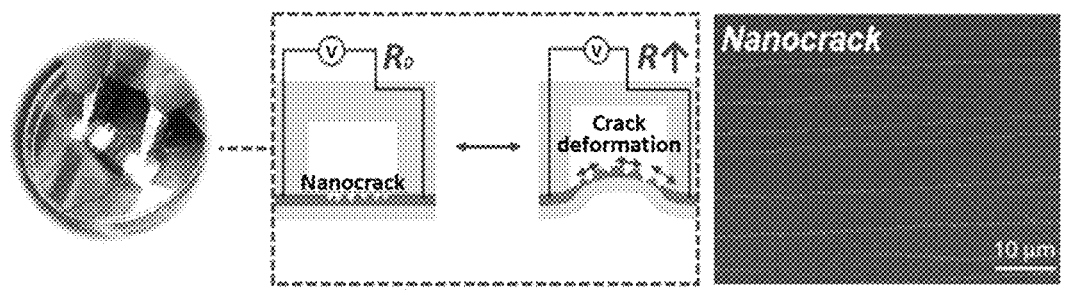

[FIG. 3]
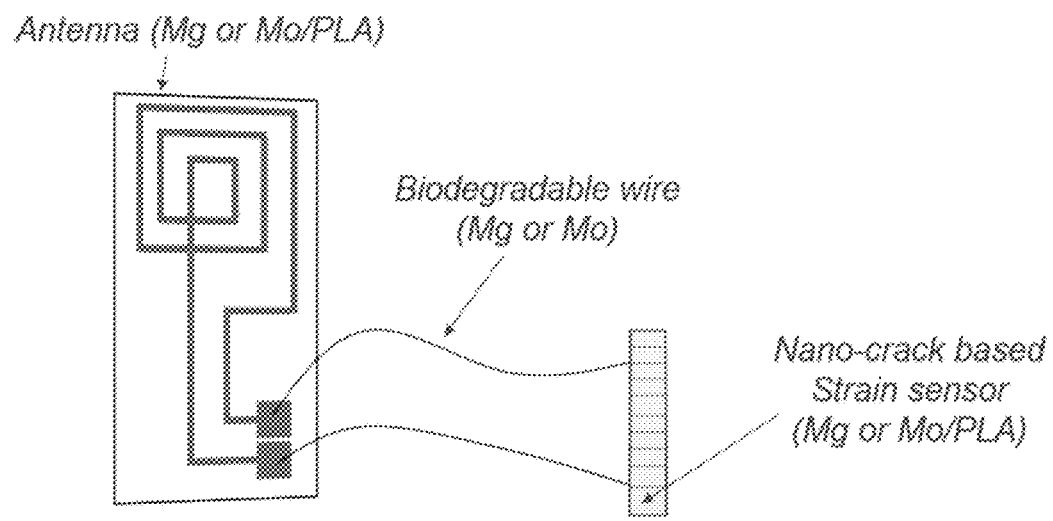
[FIG. 4]
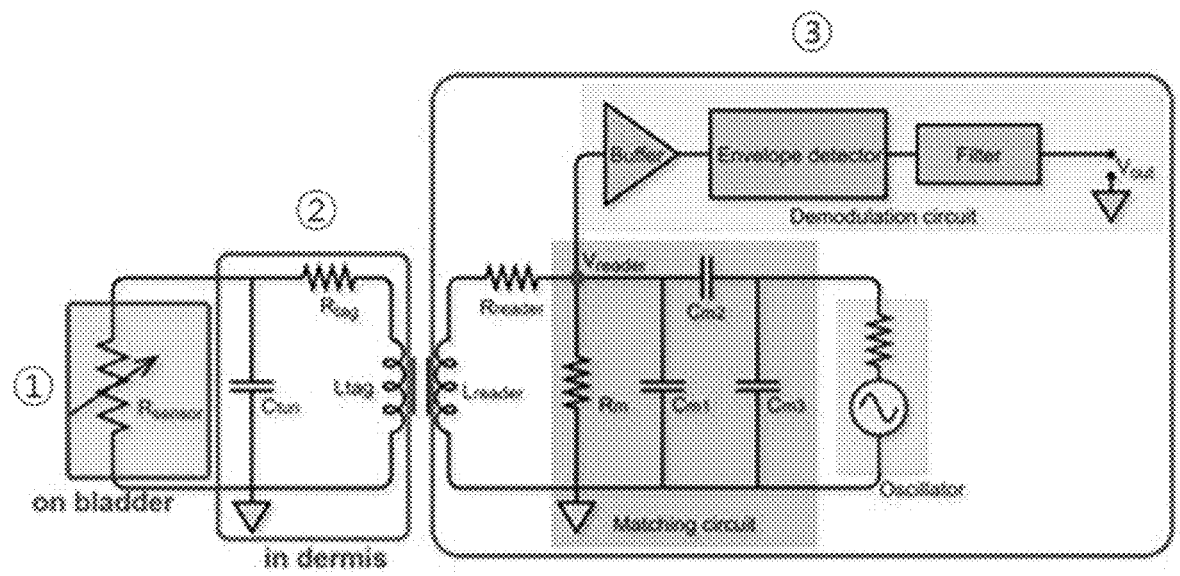

[FIG. 5]
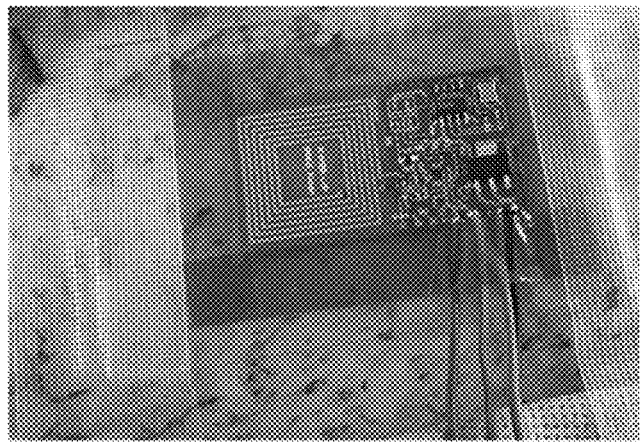
[FIG. 6]
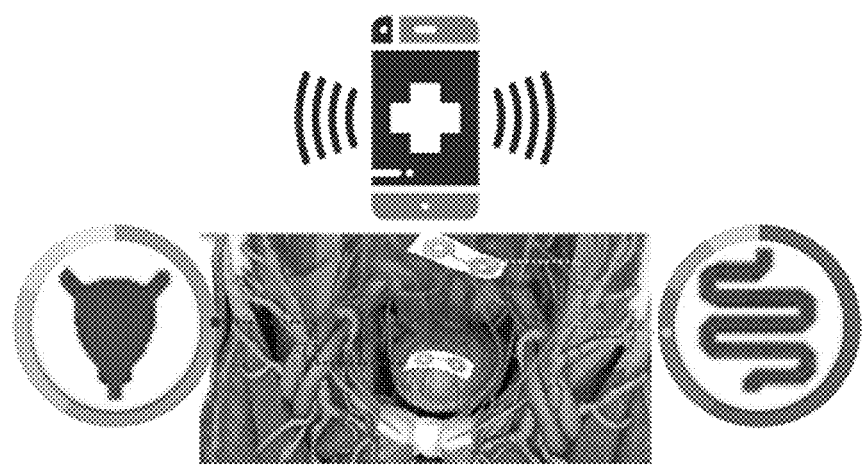

[FIG. 7]
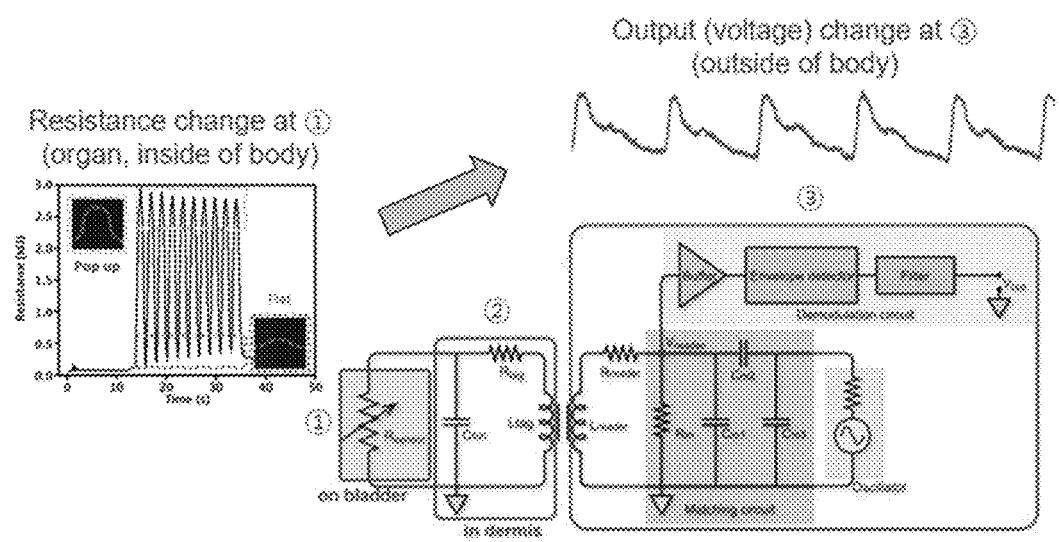
[FIG. 8]
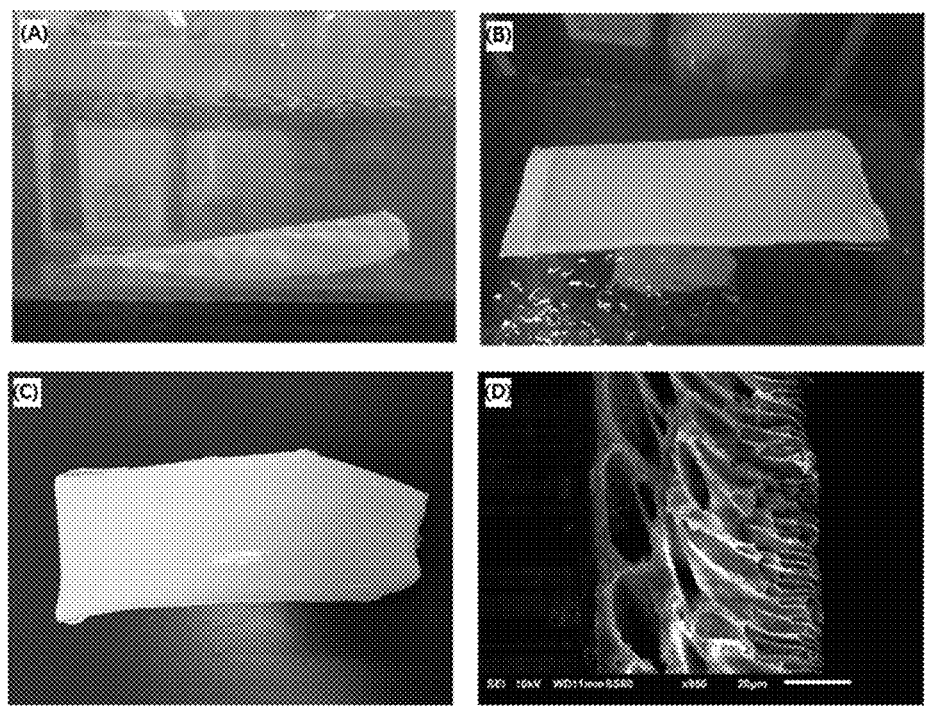

[FIG. 9]
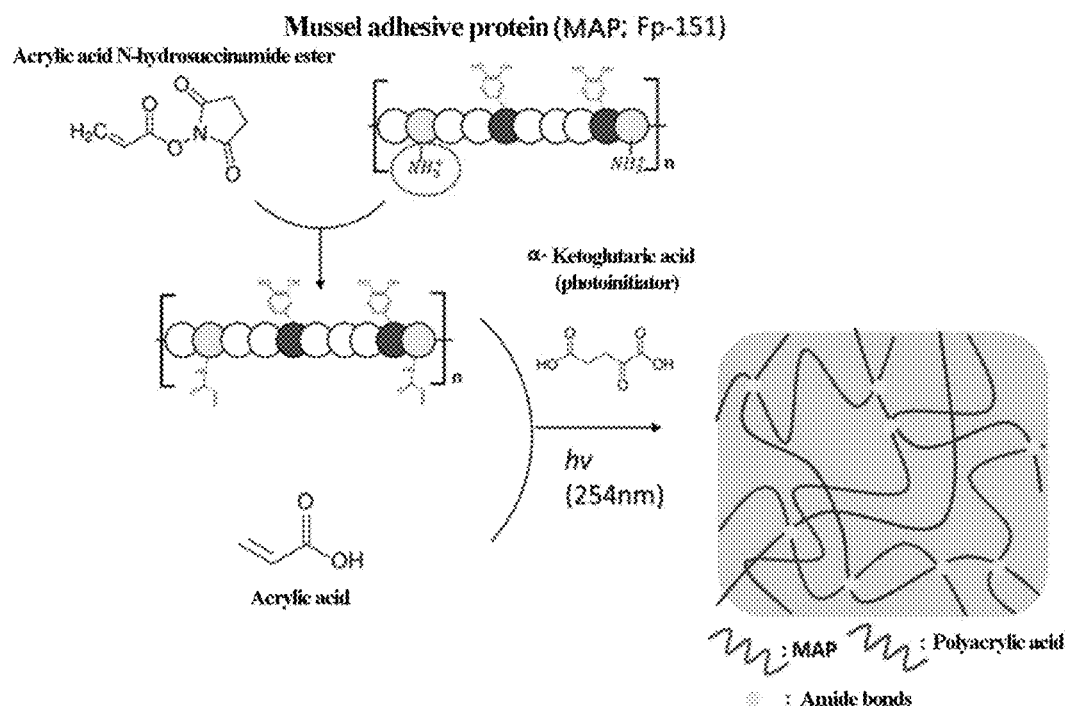
[FIG. 10]
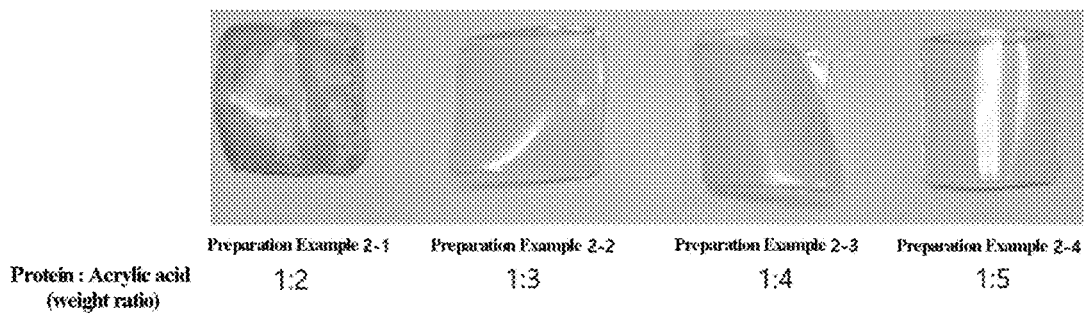

[FIG. 11]
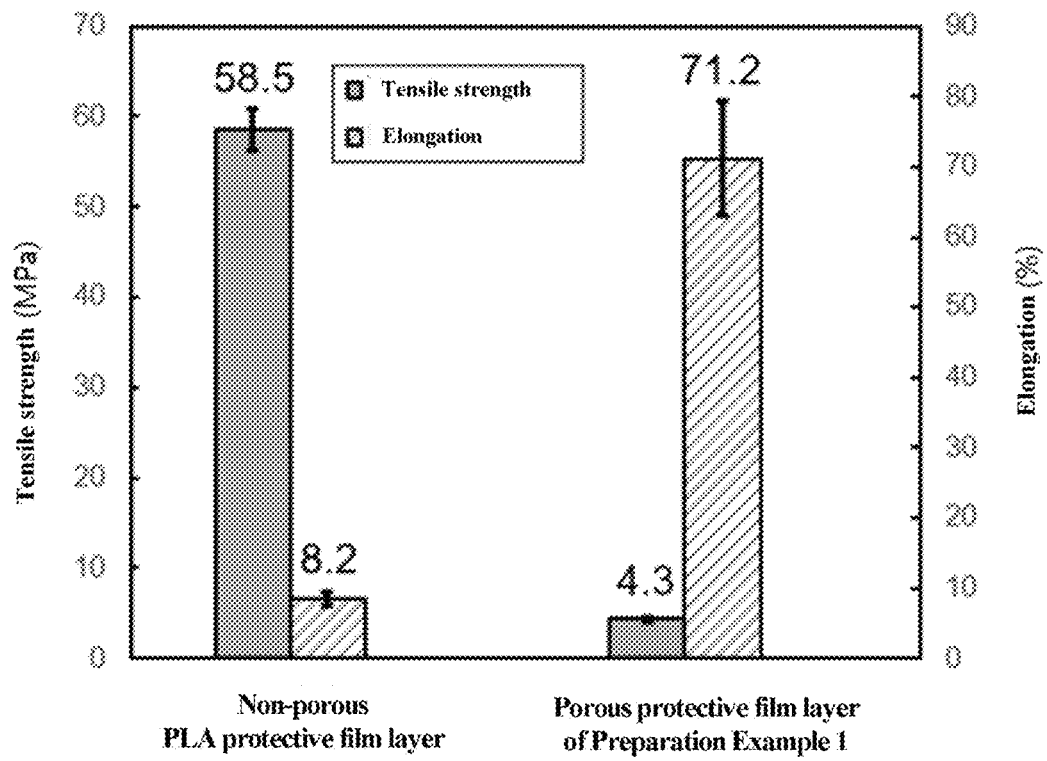
[FIG. 12]
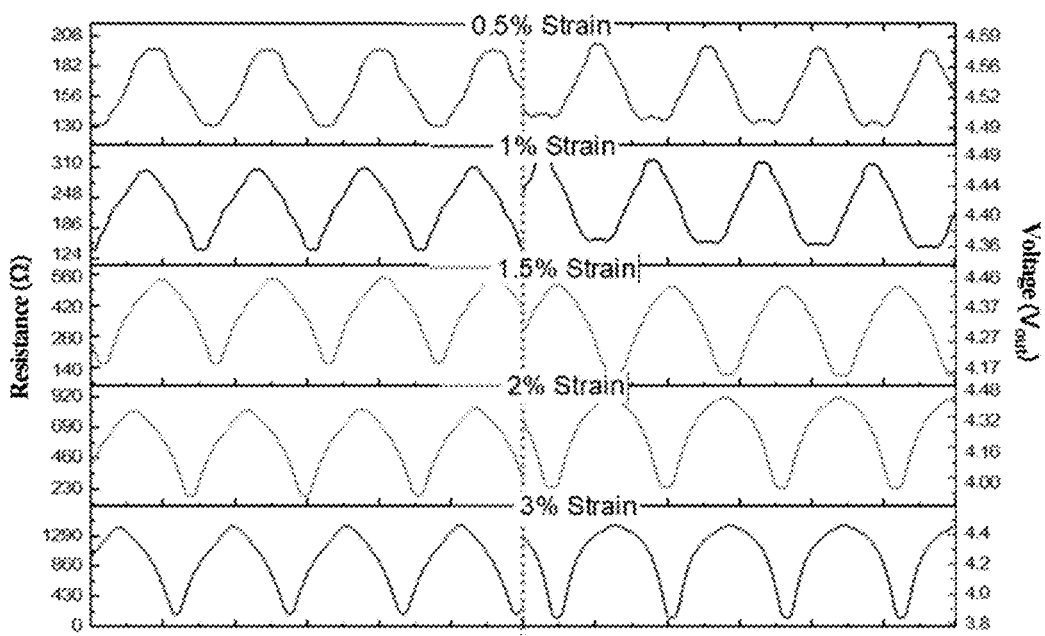

[FIG. 13]
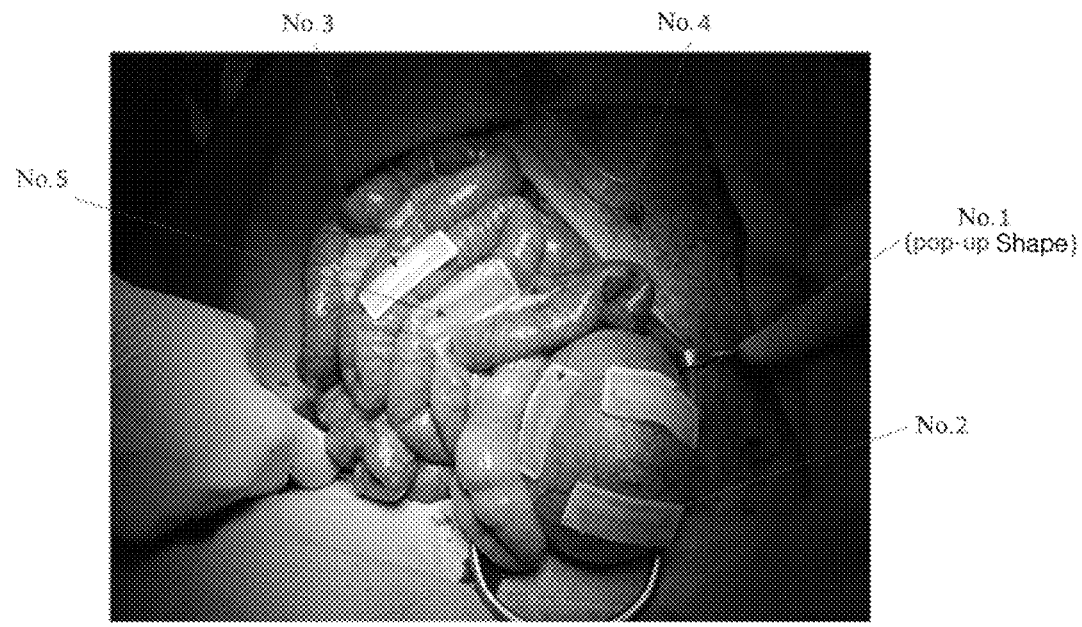
[FIG. 14]
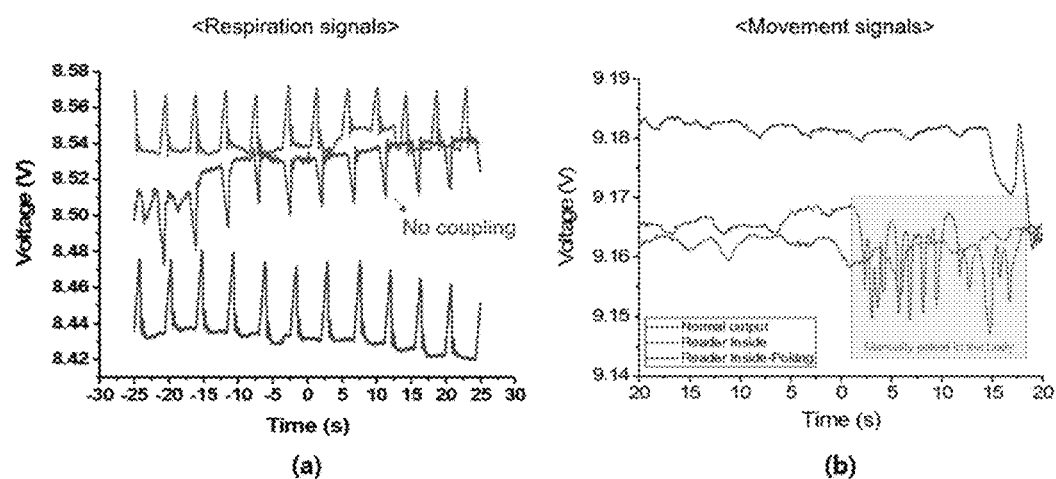

[FIG. 15]
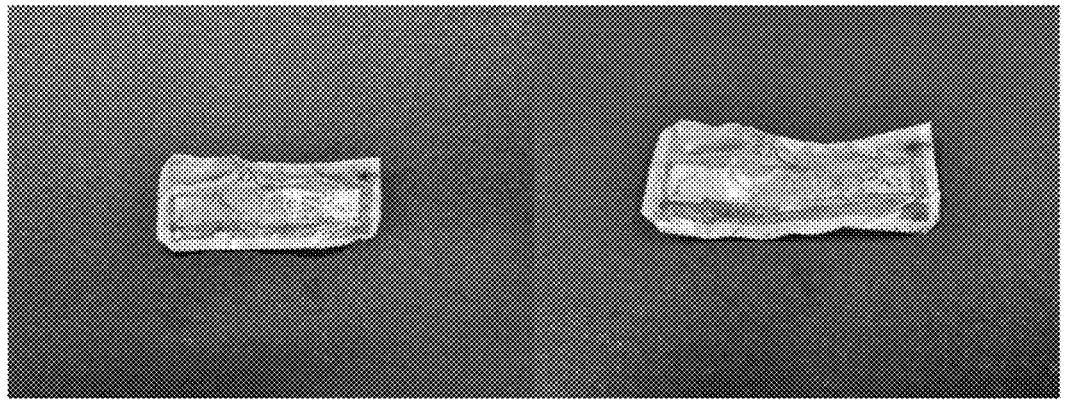
[FIG. 16]
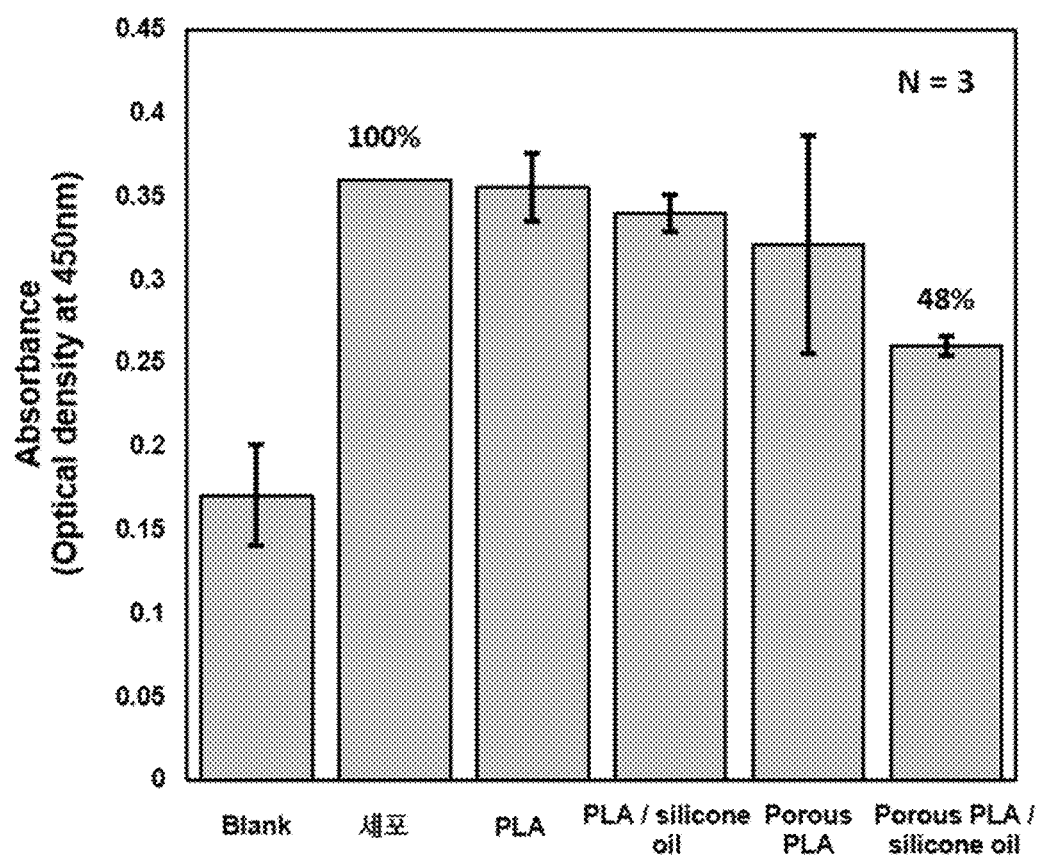

[FIG. 17]
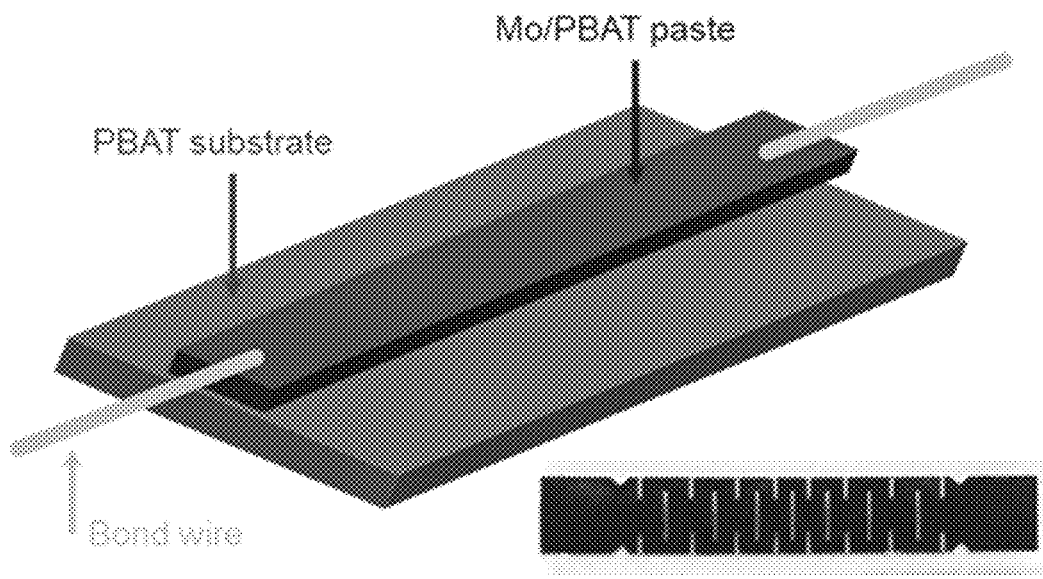
[FIG. 18]
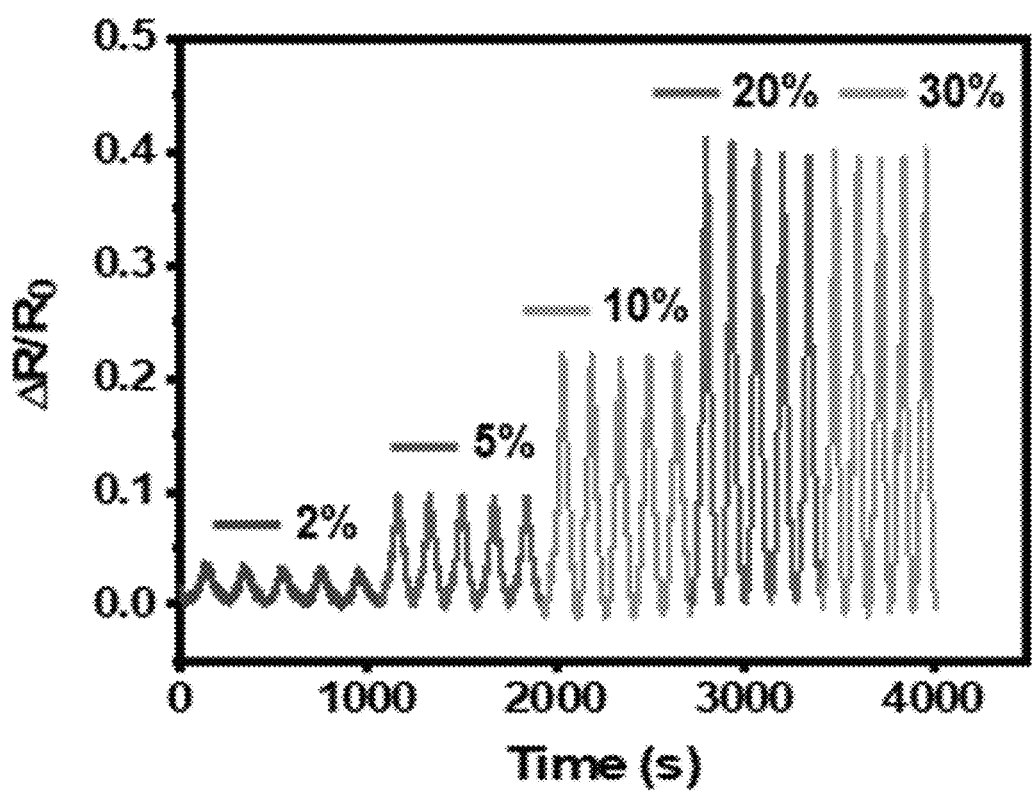

[FIG. 19]
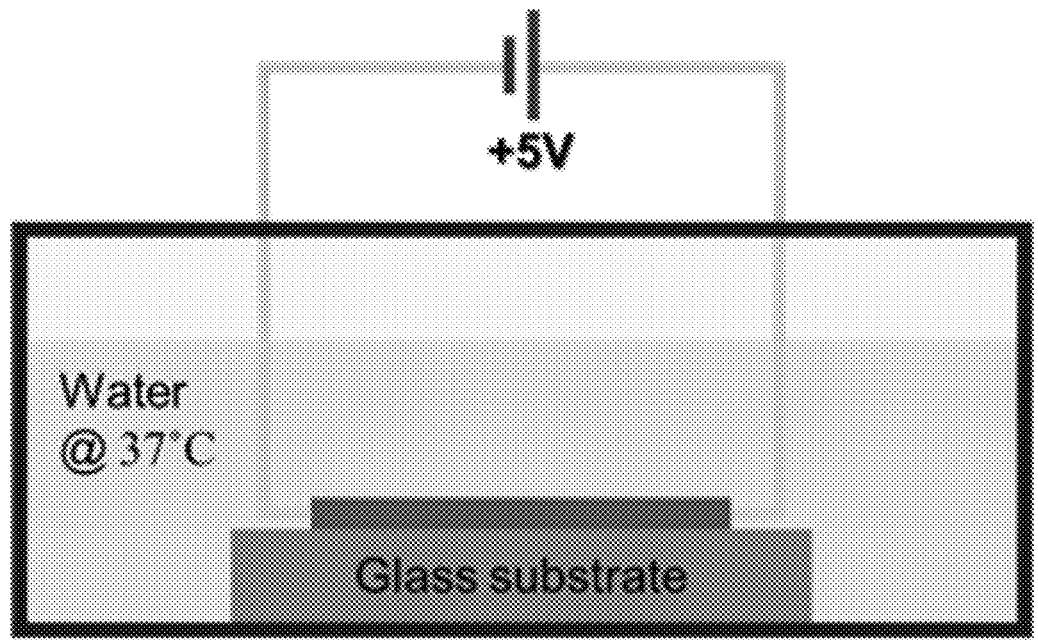

[FIG. 20]
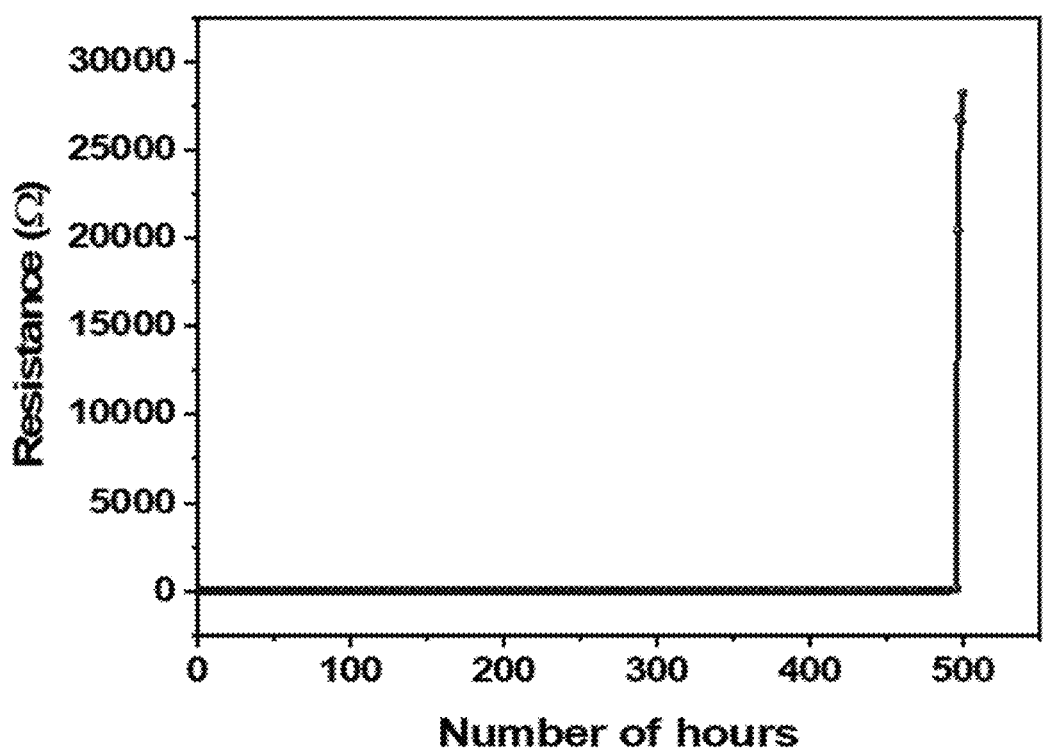

SEQUENCE LISTING

```
Sequence total quantity: 16
SEQ ID NO: 1          moltype = AA  length = 800
FEATURE               Location/Qualifiers
```

```
                        source            1..800
                                          mol_type = protein
                                          organism = synthetic construct
SEQUENCE: 1
AKPSYPPTYK AKPSYPPTYK AKPSYPPTYK AKPSYPPTYK AKPSYPPTYK AKPSYPPTYK     60
AKPSYPPTYK AKPSYPPTYK AKPSYPPTYK AKPSYPPTYK AKPSYPPTYK AKPSYPPTYK    120
AKPSYPPTYK AKPSYPPTYK AKPSYPPTYK AKPSYPPTYK AKPSYPPTYK AKPSYPPTYK    180
AKPSYPPTYK AKPSYPPTYK AKPSYPPTYK AKPSYPPTYK AKPSYPPTYK AKPSYPPTYK    240
AKPSYPPTYK AKPSYPPTYK AKPSYPPTYK AKPSYPPTYK AKPSYPPTYK AKPSYPPTYK    300
AKPSYPPTYK AKPSYPPTYK AKPSYPPTYK AKPSYPPTYK AKPSYPPTYK AKPSYPPTYK    360
AKPSYPPTYK AKPSYPPTYK AKPSYPPTYK AKPSYPPTYK AKPSYPPTYK AKPSYPPTYK    420
AKPSYPPTYK AKPSYPPTYK AKPSYPPTYK AKPSYPPTYK AKPSYPPTYK AKPSYPPTYK    480
AKPSYPPTYK AKPSYPPTYK AKPSYPPTYK AKPSYPPTYK AKPSYPPTYK AKPSYPPTYK    540
AKPSYPPTYK AKPSYPPTYK AKPSYPPTYK AKPSYPPTYK AKPSYPPTYK AKPSYPPTYK    600
AKPSYPPTYK AKPSYPPTYK AKPSYPPTYK AKPSYPPTYK AKPSYPPTYK AKPSYPPTYK    660
AKPSYPPTYK AKPSYPPTYK AKPSYPPTYK AKPSYPPTYK AKPSYPPTYK AKPSYPPTYK    720
AKPSYPPTYK AKPSYPPTYK AKPSYPPTYK AKPSYPPTYK AKPSYPPTYK AKPSYPPTYK    780
AKPSYPPTYK AKPSYPPTYK                                                800

SEQ ID NO: 2              moltype = AA  length = 10
FEATURE                   Location/Qualifiers
source                    1..10
                          mol_type = protein
                          organism = synthetic construct
SEQUENCE: 2
AKPSYPPTYK                                                            10

SEQ ID NO: 3              moltype = AA  length = 120
FEATURE                   Location/Qualifiers
source                    1..120
                          mol_type = protein
                          organism = synthetic construct
SEQUENCE: 3
AKPSYPPTYK AKPSYPPTYK AKPSYPPTYK AKPSYPPTYK AKPSYPPTYK AKPSYPPTYK     60
AKPSYPPTYK AKPSYPPTYK AKPSYPPTYK AKPSYPPTYK AKPSYPPTYK AKPSYPPTYK    120

SEQ ID NO: 4              moltype = AA  length = 472
FEATURE                   Location/Qualifiers
source                    1..472
                          mol_type = protein
                          organism = synthetic construct
SEQUENCE: 4
LFSFFLLLTC TQLCLGTNRP DYNDDEEDDY KPPVYKPSPS KYRPVNPCLK KPCKYNGVCK     60
PRGGSYKCFC KGGYYGYNCN LKNACKPNQC KNKSRCVPVG KTFKCVCRNG NFGRLCEKNV    120
CSPNPCKNNG KCSPLGKTGY KCTCSGGYTG PRCEVHACKP NPCKNKGRCF PDGKTGYKCR    180
CVDGYSGPTC QENACKPNPC SNGGTCSADK FGDYSCECRP GYFGPECERY VCAPNPCKNG    240
GICSSDGSGG YRCRCKGGYS GPTCKVNVCK PTPCKNSGRC VNKGSSYNCI CKGGYSGPTC    300
GENVCKPNPC QNRGRCYPDN SDDGFKCRCV GGYKGPTCED KPNPCNTKPC KNGGKCNYNG    360
KIYTCKCAYG WRGRHCTDKA YKPNPCVVSK PCKNRGKCIW NGKAYRCKCA YGYGGRHCTK    420
KSYKKNPCAS RPCKNRGKCT DKGNGYVCKC ARGYSGRYCS LKSPPSYDDD EY            472

SEQ ID NO: 5              moltype = AA  length = 50
FEATURE                   Location/Qualifiers
source                    1..50
                          mol_type = protein
                          organism = synthetic construct
SEQUENCE: 5
PWADYYGPKY GPPRRYGGGN YNRYGRRYGG YKGWNNGWKR GRWGRKYYGS                 50

SEQ ID NO: 6              moltype = AA  length = 750
FEATURE                   Location/Qualifiers
source                    1..750
                          mol_type = protein
                          organism = synthetic construct
SEQUENCE: 6
YGRRYGEPSG YANIGHRRYY ERAISFHRHS HVHGHHLLHR HVRHSVLHG HVHMHRVSHR      60
IMHRHRVLHG HVRHRVLHN HVHRHSVLHG HVHRHRVLHR HVHRHNVLHG HVHRHRVLHK     120
HVNHRVLHK HLLKHQVLHG HVHRHQVLHG HVHNHRVLHG HVHRHQVLHG HVHTHRVLHK     180
HVHKHRVLHK HLHKHQVLHG HIHTHRVLHK HLHKHQVLHG HVHTHRVLHK HVHKHRVLHK    240
HLHKHQVLHG HVHMHRVLHK HVHKHRVLHK HVHKHHVVHK HVHSHRVLHK HVHKHRVEHQ    300
HVHKHHVLHR HVHSHHVVHS HVHKHRVVHS HVHKHNVVHS HVHRHQILHR HVHRHQVVHR    360
HVHRHLIAHR HIHSHQAAVH RHVHTHFEGN FNDDGTDVNL RIRHGIIYFG GNTYRLSGGR    420
RRFMTLWQEC LESYGDSDEC FVQLLEGNQH LFTVVQGHHS TSFRSDLSND LHPDNNIEQI    480
ANDHVNDIAQ STDGDINDFA DTHYNDVAPI ADVHVDNIAQ TADNHVKNIA QTAHHHVNDV    540
AQIADDHVND IGQTAYDHVN NIGQTADDHV NDIAQTADDH VNAIAQTADD HVNAIAQTAD    600
DHVNDIGDTA NSHIVRVQGV AKNHLYGINK AIGKHIQHLK DVSNRHIEKL NNHATKNLLQ    660
SALQHKQQTI EREIQHKRHL SEKEDINLQH ENAMKSKVSY DGPVFNEKVS VVSNQGSYNE    720
KVPVLSNGGG YNGKVSALSD QGSYNEGYAY                                    750
```

```
SEQ ID NO: 7              moltype = AA  length = 82
FEATURE                   Location/Qualifiers
source                    1..82
                          mol_type = protein
                          organism = synthetic construct
SEQUENCE: 7
KHHHHHHSSE EYKGGYYPGN TYHYHSGGSY HGSGYHGGYK GKYYGKAKKY YYKYKNSGKY    60
KYLKKARKYH RKGYKKYYGG SS                                             82

SEQ ID NO: 8              moltype = AA  length = 103
FEATURE                   Location/Qualifiers
source                    1..103
                          mol_type = protein
                          organism = synthetic construct
SEQUENCE: 8
IAALCGIVKS IDSDDSDYDY KGRGYCTNKG CRSGYNYFGN KGYCKYGEKS YTYNCNSYAG    60
CCLPRNPYGK LKYYCTNKYG CPNNYYFYNN KGYYYLEHHH HHH                     103

SEQ ID NO: 9              moltype = AA  length = 199
FEATURE                   Location/Qualifiers
source                    1..199
                          mol_type = protein
                          organism = synthetic construct
SEQUENCE: 9
AKPSYPPTYK AKPSYPPTYK AKPSYPPTYK AKPSYPPTYK AKPSYPPTYK AKPSYPPTYK    60
PWSSEEYKGG YYPGNTYHYH SGGSYHGSGY HGGYKGKYYG KAKKYYYKYK NSGKYKYLKK   120
ARKYHRKGYK KYYGGGSSAK PSYPPTYKAK PSYPPTYKAK PSYPPTYKAK PSYPPTYKAK   180
PSYPPTYKAK PSYPPTYKL                                                199

SEQ ID NO: 10             moltype = AA  length = 171
FEATURE                   Location/Qualifiers
source                    1..171
                          mol_type = protein
                          organism = synthetic construct
SEQUENCE: 10
AKPSYPPTYK AKPSYPPTYK AKPSYPPTYK AKPSYPPTYK AKPSYPPTYK AKPSYPPTYK    60
PWADYYGPKY GPPRRYGGGN YNRYGRRYGG YKGWNNGWKR GRWGRKYYGS AKPSYPPTYK   120
AKPSYPPTYK AKPSYPPTYK AKPSYPPTYK AKPSYPPTYK AKPSYPPTYK L            171

SEQ ID NO: 11             moltype = AA  length = 175
FEATURE                   Location/Qualifiers
source                    1..175
                          mol_type = protein
                          organism = synthetic construct
SEQUENCE: 11
PWADYYGPKY GPPRRYGGGN YNRYGRRYGG YKGWNNGWKR GRWGRKYYPW SSEEYKGGYY    60
PGNTYHYHSG GSYHGSGYHG GYKGKYYGKA KKYYYKYKNS GKYKYLKKAR KYHRKGYKKY   120
YGGSSGSADY YGPKYGPPRR YGGGNYNRYG RRYGGYKGWN NGWKRGRWGR KYYGS        175

SEQ ID NO: 12             moltype = AA  length = 187
FEATURE                   Location/Qualifiers
source                    1..187
                          mol_type = protein
                          organism = synthetic construct
SEQUENCE: 12
AKPSYPPTYK AKPSYPPTYK AKPSYPPTYK AKPSYPPTYK AKPSYPPTYK AKPSYPPTYK    60
PWSSEEYKGG YYPGNTYHYH SGGSYHGSGY HGGYKGKYYG KAKKYYYKYK NSGKYKYLKK   120
ARKYHRKGYK KYYGGSSGSA DYYGPKYGPP RRYGGGNYNR YGRRYGGYKG WNNGWKRGRW   180
GRKYYGS                                                             187

SEQ ID NO: 13             moltype = AA  length = 187
FEATURE                   Location/Qualifiers
source                    1..187
                          mol_type = protein
                          organism = synthetic construct
SEQUENCE: 13
PWADYYGPKY GPPRRYGGGN YNRYGRRYGG YKGWNNGWKR GRWGRKYYPW SSEEYKGGYY    60
PGNTYHYHSG GSYHGSGYHG GYKGKYYGKA KKYYYKYKNS GKYKYLKKAR KYHRKGYKKY   120
YGGSSGSAKP SYPPTYKAKP SYPPTYKAKP SYPPTYKAKP SYPPTYKAKP SYPPTYKAKP   180
SYPPTYK                                                             187

SEQ ID NO: 14             moltype = AA  length = 60
FEATURE                   Location/Qualifiers
source                    1..60
                          mol_type = protein
                          organism = synthetic construct
SEQUENCE: 14
AKPSYPPTYK AKPSYPPTYK AKPSYPPTYK AKPSYPPTYK AKPSYPPTYK AKPSYPPTYK    60
```

```
SEQ ID NO: 15          moltype = AA   length = 196
FEATURE                Location/Qualifiers
source                 1..196
                       mol_type = protein
                       organism = synthetic construct
SEQUENCE: 15
AKPSYPPTYK AKPSYPPTYK AKPSYPPTYK AKPSYPPTYK AKPSYPPTYK AKPSYPPTYK    60
SSEEYKGGYY PGNTYHYHSG GSYHGSGYHG GYKGKYYGKA KKYYYKYKNS GKYKYLKKAR   120
KYHRKGYKKY YGGGSSAKPS YPPTYKAKPS YPPTYKAKPS YPPTYKAKPS YPPTYKAKPS   180
YPPTYKAKPS YPPTYK                                                  196

SEQ ID NO: 16          moltype = AA   length = 76
FEATURE                Location/Qualifiers
source                 1..76
                       mol_type = protein
                       organism = synthetic construct
SEQUENCE: 16
SSEEYKGGYY PGNTYHYHSG GSYHGSGYHG GYKGKYYGKA KKYYYKYKNS GKYKYLKKAR    60
KYHRKGYKKY YGGGSS                                                   76
```

TRANSIENT BIO-ADHESIVE DEVICE FOR ORGAN MONITORING

CROSS-REFERENCE TO RELATED APPLICATIONS

This application is based on and claims priority from Korean Patent Application No. 10-2022-0075645, filed on Jun. 21, 2022, with the Korean Intellectual Property Office, the disclosure of which is incorporated herein in its entirety by reference.

REFERENCE TO AN ELECTRONIC SEQUENCE LISTING

The contents of the electronic sequence listing (JPG20232078US_SEQ.xml; Size: 18 K bytes; and Date of Creation: Nov. 24, 2023) is herein incorporated by reference in its entirety. The contents of the electronic sequence listing in no way introduces new matter into the specification.

TECHNICAL FIELD

The present disclosure relates to a transient bio-adhesive device for organ monitoring.

BACKGROUND

With the advent of the 4th industrial era and the development of IoT technology, the demand for diagnosis/treatment technology through personalized health monitoring is increasing, and the development of personalized high-tech medical devices is rapidly occurring.

In this regard, in Korean Patent Registration No. 10-2368595, there is disclosed a biomonitoring device capable of providing biomonitoring information, and a technique for measuring biosignals through the biomonitoring device. However, there are problems in that the device is large and may not be applied to the inside of the body, such as causing various side effects.

Accordingly, among personalized high-tech medical devices, biomedical transient electronics, which are high-tech medical devices for insertion into the body that implement diagnosis or treatment functions inside the human body and are absorbed into the human body through biodegradation, are particularly in the spotlight as next-generation medical devices.

Since the biomedical transient electronics need to be harmlessly absorbed into the human body through biodegradation after realizing medical functions for a predetermined period of time inside the human body, strict verification of biological stability is required.

In this regard, various studies on bio-signal monitoring devices and the like are being actively conducted. Specifically, there is a need for various studies on methods of collecting nerve signals for a long time by inserting a flexible polymer-based electrical electrode into the body without causing serious inflammation despite inserting an ultra-thin flexible polymer-based electrode device into the body for a long time, or flexible devices that may perform drug delivery as well as signal control through light stimulation and electrical stimulation. In particular, in order to develop devices that may be inserted into the body, it is necessary to develop research that various factors such as the size of the device, wireless communication technology and method, and biostability are considered significant.

SUMMARY

The present disclosure has been made in an effort to provide a bio-adhesive device for insertion into the body capable of monitoring problems such as reduced activity of motility internal organs (e.g., bladder, small intestine, etc.) that may occur after surgery, procedures, and the like.

In addition, the present disclosure has also been made in an effort to provide a monitoring device including the bio-adhesive device and a receiver.

In addition, the present disclosure has also been made in an effort to provide a method for monitoring body internal organs using the monitoring device.

An exemplary embodiment of the present disclosure provides a bio-adhesive device including an adhesive material layer, an electronic device layer and a protective film layer.

In addition, another exemplary embodiment of the present disclosure provides a monitoring device including the bio-adhesive device and a receiver.

In addition, yet another exemplary embodiment of the present disclosure provides a method for monitoring internal organs using the monitoring device.

According to the exemplary embodiments of the present disclosure, the bio-adhesive device has advantages of having no need for a separate removal process, and being able to easily observe the movement of internal organs in real time from the outside by being harmless to the human body and naturally degraded in the body.

In addition, the monitoring device of the present disclosure has the same advantages as described above by including the bio-adhesive device.

In addition, the monitoring method of the present disclosure has an advantage of being able to more sensitively observe movements of internal organs in real time by using the monitoring device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is an image of a bio-adhesive device of the present disclosure.

FIG. 2 is a schematic diagram of a process of forming nano-cracks in a sensor unit of the present disclosure and an image of nano-cracks formed as a result.

FIG. 3 is a schematic diagram of a sensor unit and a frequency conversion unit of the present disclosure.

FIG. 4 is a schematic diagram of a monitoring device of the present disclosure.

FIG. 5 is an image of some components of the receiver of the present disclosure.

FIGS. 6 and 7 are schematic diagrams illustrating an operating principle of a monitoring device of the present disclosure.

FIG. 8 is an image of a preparing process of a protective film layer of Preparation Example 1 of the present disclosure. FIG. 8A is an image of immersing a glass plate with a liquid film in a solution containing distilled water, FIG. 8B is an image of solidifying the immersed liquid film, FIG. 8C is an image of vacuum drying the solidified liquid film, and FIG. 8D is a scanning electron microscope image of pores of the finally completed protective film layer.

FIG. 9 is a schematic diagram illustrating a preparing process of an adhesive material layer of Preparation Example 2 of the present disclosure.

FIG. 10 is an image of adhesive material layers prepared in Preparation Examples 2-1 to 2-4 of the present disclosure.

FIG. 11 is a diagram illustrating an experimental result of Experimental Example 1 of the present disclosure.

FIG. 12 is a diagram illustrating an experimental result of Experimental Example 2 of the present disclosure.

FIG. 13 is an image of attaching a bio-adhesive device to an organ of a mini-pig in Experimental Example 3 of the present disclosure.

FIG. 14 is a diagram illustrating an experimental result of Experimental Example 3 of the present disclosure.

FIG. 15 is an image illustrating a result of Experimental Example 4 of the present disclosure.

FIG. 16 is an image illustrating a cell adhesion experimental result of Experimental Example 5 of the present disclosure.

FIG. 17 is an image of a strain sensor prepared in Preparation Example 4 of the present disclosure.

FIG. 18 is a diagram illustrating an experimental result of Experimental Example 6 of the present disclosure. In FIG. 18, ΔR means a resistance change value, and RO means an initial resistance value.

FIG. 19 is a schematic diagram of an experimental process of Experimental Example 7 of the present disclosure.

FIG. 20 is a diagram illustrating an experimental result of Experimental Example 7 of the present disclosure.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

In this specification, it will be understood that when a certain member is referred to as being "on" the other member, not only a member may be directly on the other member, but also another member is interposed between the two members.

In the present specification, when a certain part "comprises" a certain component, this means that the part may further include another component without excluding another component unless otherwise stated.

Hereinafter, the present disclosure will be described in more detail.

<Bio-Adhesive Device>

A bio-adhesive device according to an aspect of the present disclosure includes an adhesive material layer, an electronic device layer, and a protective film layer to have an advantage of having no a separate removal process by being harmless to the human body and being naturally degraded in the body, and have an advantage of being able to observe the movement of internal organs more closely in real time from outside the body (see FIG. 1).

Adhesive Material Layer

An adhesive device according to an aspect of the present disclosure includes an adhesive material layer, and the adhesive material layer serves to attach the adhesive device to an internal organ. According to an exemplary embodiment of the present disclosure, the adhesive material layer may include at least one selected from the group consisting of a mussel adhesive protein, a silk protein, polylactic acid, hydroxypropyl methyl cellulose, and hyaluronic acid, preferably a mussel adhesive protein. Through this, the adhesive material has an advantage of being harmless to the human body and being naturally degraded in the body after a certain period of time.

The mussel adhesive protein is a protein derived from the byssus of mussels, preferably may include a mussel adhesive protein derived from *Mytilus edulis*, *Mytilus galloprovincialis* or *Mytilus coruscus* or a variant thereof, but is not limited thereto.

The mussel adhesive protein may include *Mytilus edulis* foot protein (Mefp)-1, *Mytilus galloprovincialis* foot protein (Mgfp)-1, *Mytilus coruscus* foot protein (Mcfp)-1, Mefp-2, Mefp-3, Mgfp-3, Mgfp-5 derived from the mussel species, respectively or a variant thereof, preferably a protein selected from the group consisting of foot protein (fp)-1 (SEQ ID NO: 1), fp-2 (SEQ ID NO: 4), fp-3 (SEQ ID NO: 5), fp-4 (SEQ ID NO: 6), fp-5 (SEQ ID NO: 7), and fp-6 (SEQ ID NO: 8), a fusion protein in which two or more kinds of proteins are linked, or a variant of the protein, but is not limited thereto.

In addition, the mussel adhesive protein may include all mussel adhesive proteins described in International Patent Publication No. WO2006/107183 or WO2005/092920, preferably may include fusion proteins of fp-151 (SEQ ID NO: 9), fp-131 (SEQ ID NO: 10), fp-353 (SEQ ID NO: 11), fp-153 (SEQ ID NO: 12), and fp-351 (SEQ ID NO: 13), but is not limited thereto. In addition, the mussel adhesive protein of the present disclosure may include a polypeptide in which decapeptides (SEQ ID NO: 2) repeated about 80 times in fp-1 are continuously linked to each other 1 to 12 times or more.

In addition, the mussel adhesive protein may include a polypeptide in which decapeptides (SEQ ID NO: 2) repeated about 80 times in fp-1 are continuously linked to each other 1 to 12 times or more. Preferably, the mussel adhesive protein may be an fp-1 variant polypeptide (SEQ ID NO: 3) in which decapeptides of SEQ ID NO: 2 are continuously linked to each other 12 times, but is not limited thereto.

In addition, the mussel adhesive protein may also be a variant of fp-151 (SEQ ID NO: 15), but is not limited thereto. Compared to SEQ ID NO: 9, the protein sequence of SEQ ID NO: 15 is a sequence excluding a linker sequence and the like. Specifically, the protein sequence of SEQ ID NO: 15 is a fusion protein sequence in which the sequence of Mgfp-5 represented by SEQ ID NO: 16 is fused between the fp-1 variant sequences represented by SEQ ID NO: 14.

In addition, the mussel adhesive protein may be modified within a range including a conserved amino acid sequence capable of maintaining the characteristics of mussel adhesive proteins required in the present disclosure.

That is, the scope of the present disclosure may include amino acid sequences having sequence identify of 70% or more, preferably 80% or more, and much more preferably 90% or more, that is, 95%, 96%, 97%, 98%, and 99% or more with the amino acid sequences of SEQ ID NOs that exhibit substantially equivalent effects.

According to an exemplary embodiment of the present disclosure, the mussel adhesive protein may include a protein with tyrosine residues converted to catechol compounds; a protein introduced with a catechol derivative onto the surface of the mussel adhesive protein; or all these thereof. Preferably, the mussel adhesive protein may be a protein with tyrosine residues converted into catechol compounds, and in this case, it is preferable that 10% to 100% of the tyrosine residues are converted into catechol compounds.

The proportion of tyrosine in the entire amino acid sequence of most mussel adhesive proteins may be about 1% to 50%. The tyrosine in the mussel adhesive protein may be converted to DOPA, a catechol compound added with an OH group through a hydration process. However, in mussel adhesive proteins produced in *Escherichia coli*, since tyrosine residues are not converted, it is preferred to perform a modification reaction of converting tyrosine into DOPA by a separate enzymatic and chemical treatment method. Methods known in the art may be used as the method for modifying the tyrosine residue included in the mussel adhesive protein into DOPA, and are not particularly limited in the present disclosure.

The catechol compound is a compound containing a dihydroxy group, and refers to a compound that imparts adhesive strength to the mussel adhesive protein through a crosslinking action. According to an exemplary embodiment of the present disclosure, the catechol compound may include at least one selected from the group consisting of 3,4-dihydroxyphenylalanine (DOPA), Dopa o-quinone, 2,4,5-trihydroxyphenylalanine (TOPA), Topa quinone and derivatives thereof, and in this case, there is an advantage of more improving the adhesive strength of the adhesive material layer including the catechol compound.

The mussel adhesive protein may consist of at least one amino acid sequence selected from the group consisting of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, and SEQ ID NO: 16.

In the present disclosure, mutants of the mussel adhesive protein in the present disclosure are preferably mutants that an additional sequence is included at a carboxyl-terminus or amino-terminus of the mussel adhesive protein, or some amino acids are substituted with other amino acids, on the premise of maintaining the adhesive strength of the mussel adhesive protein. More preferably, a polypeptide consisting of 3 to 25 amino acids including RGD is linked to the carboxyl-terminus or amino-terminus of the mussel adhesive protein, or 1% to 100%, preferably 5% to 100% of the total number of tyrosine residues constituting the mussel adhesive protein may be substituted with 3,4-dihydroxyphenyl-L-alanine (DOPA).

The mussel adhesive protein is not limited thereto, but preferably may be mass-produced by genetic engineering by inserting a gene into a conventional vector produced to express an external gene. The vector may be appropriately selected or newly produced according to the type and characteristics of a host cell for producing the protein. A method of transforming the vector into a host cell and a method of producing a recombinant protein from a transformant may be easily performed by conventional methods. Methods such as selection, construction, and transformation of the vector, and expression of recombinant proteins may be easily performed by those skilled in the art, and some modifications of conventional methods are also included in the scope of the present disclosure.

According to an exemplary embodiment of the present disclosure, the adhesive material layer may further include polyacrylic acid together with the above-described mussel adhesive protein, and the polyacrylic acid and the mussel adhesive protein may be linked to each other by amide bonds to form a composition for forming an adhesive material layer forming a three-dimensional network structure. The composition does not exhibit adhesive strength and is non-degradable in a dry state, but may exhibit the adhesive strength in a wet state. In the wet state, the van der Waals force and hydrophilic attraction between the mussel adhesive protein and the polyacrylic acid in the composition act together with the water adhesive strength of the catechol residue of the mussel adhesive protein, such as a dopamine residue, thereby further improving the adhesive strength.

According to an exemplary embodiment of the present disclosure, the mixing ratio of the mussel adhesive protein and the polyacrylic acid may be 1:1 to 1:5 based on a weight. The physical properties of the prepared composition may be adjusted by adjusting the weight ratio of the mussel adhesive protein and the polyacrylic acid. The weight ratio of the mussel adhesive protein and the polyacrylic acid may be preferably 1:2.5 to 1:3.5, more preferably 1:3. When the weight ratio of the polyacrylic acid to the mussel adhesive protein is less than the above range, the residual amount of protein crystals remain in the composition, the flexibility of the adhesive material layer including the protein crystals may be lowered, so that the adhesive material layer may be broken, and expensive proteins are discarded due to unreacted reaction, and thus, economic feasibility may be reduced. In addition, when the weight ratio of the polyacrylic acid to the mussel adhesive protein exceeds the above range, the ratio of polyacrylic acid is too high and may inhibit the water adhesive strength of the dopamine residue of the mussel adhesive protein, thereby reducing the adhesive strength. On the other hand, when the content of polyacrylic acid to the mussel adhesive protein is within the above range, there is no unreacted protein in the composition, it is possible to prepare an adhesive material layer with excellent flexibility and tensile strength of the composition, maximize the water adhesion by the dopamine residue of the mussel adhesive protein, and prepare an adhesive material layer with no or very low cytotoxicity while having excellent biodegradability.

As such, when the adhesive material layer of the present disclosure includes both the mussel adhesive protein and the polyacrylic acid, the adhesive material layer may be more easily biodegraded by a biological enzyme in the body, and even when the adhesive material layer containing the mussel adhesive protein and the polyacrylic acid is biodegraded, the acrylic monomer is not separated or eluted from the adhesive material layer, so that there is no cytotoxicity and stability is better.

Although not limited thereto, for example, the adhesive material layer containing the mussel adhesive protein and the polyacrylic acid may be prepared by (a) preparing a mixed solution by mixing a solution containing the mussel adhesive protein and a solution containing acrylic acid N-hydrosuccinimide ester; (b) dissolving a photoinitiator in the mixed solution; (c) adding acrylic acid monomers; and (d) curing.

At this time, the type of photoinitiator is not particularly limited in the present disclosure, and any photoinitiator capable of forming polyacrylic acid may be used, and may be, for example, α-ketoglutaric acid.

The curing in step (d) may be co-curing, preferably irradiation with light of 200 to 300 nm, for example, light of 254 nm. Polyacrylic acid is formed from acrylic acid monomers by the light irradiation and the photoinitiator, and amide bonds are formed between the mussel adhesive protein and the polyacrylic acid, thereby forming a three-dimensional network structure.

A drying step may be further included if necessary after (d) curing step.

The silk protein is extracted from cocoons and may refer to one of medical polymer materials harmless to the human body consisting of hydrophilic sericin structurally surrounding the outside and glossy hydrophobic fibroin inside.

The polylactic acid may be a polylactic acid homopolymer obtained by a polycondensation reaction of only lactic acid components as raw material monomers or a polylactic acid copolymer obtained by a polycondensation reaction of lactic acid components as raw material monomers and other monomer components copolymerizable therewith.

The hyaluronic acid may refer to a polymer consisting of two sugars, glucuronic acid and N-acetyl glucosamine, and may refer to a natural mucopolysaccharide widely distributed in the interstitium of human tissue. The hyaluronic acid is present in a large amount in human joint fluid, cartilage, skin, eyeball, etc., serves as a three-dimensional cross-linking between intercellular molecules, and may contain carboxyl groups as a hydrophilic group.

Electronic Device Layer

The adhesive device according to an aspect of the present disclosure includes an electronic device layer, which serves to detect the motility of the internal organ, and the electronic device layer according to an exemplary embodiment of the present disclosure may include a sensor unit and a frequency conversion unit.

Sensor Unit

The sensor unit may be, for example, a pressure or strain sensor, and serves to recognize the motility of the organ by adhering to the surface of the organ.

According to an exemplary embodiment of the present disclosure, the sensor unit may include a nano-crack based sensor on one surface (see FIG. 2). In this case, there is an advantage that the sensitivity of the sensor unit is maximized to respond sensitively to small movement of the organ.

In addition, according to an exemplary embodiment of the present disclosure, the sensor unit may include a substrate and a metal layer.

As long as the substrate is harmless when inserted into the body and may be naturally degraded, the type thereof is not particularly limited in the present disclosure. For example, the substrate may include at least one selected from the group consisting of polycaprolactone (PCL), polydioxanone (PDO), poly(L-lactide) (PLLA), poly(DL-lactide-co-glycolide) (PLGA), polyethylene oxide (PEO), polylactic acid (PLA), and polyvinyl alcohol (PVA), and according to an exemplary embodiment of the present disclosure, the substrate may include PLA. In addition, the thickness of the substrate layer may be, for example, 1 to 100 μm, preferably 30 to 80 μm, and more preferably 40 to 60 μm, but is not limited thereto.

The metal layer serves to detect the movement of the organ through changes in electrical resistance. As long as the metal is harmless to the body and may be naturally degraded in the body, the type thereof is not particularly limited in the present disclosure, but according to an exemplary embodiment of the present disclosure, the metal may include magnesium (Mg) or molybdenum (Mo). In addition, the thickness of the metal layer may be, for example, 50 to 200 nm, preferably 80 to 150 nm, and more preferably 90 to 120 nm, but is not limited thereto.

The sensor unit may be manufactured using known techniques widely known in the art, but is not particularly limited in the present disclosure. For example, the sensor unit may be manufactured by depositing a metal material for forming the metal layer on one side of the substrate layer using an e-beam evaporator or sputter, and forming a nano-crack structure on the surface of the metal layer through a bending process (see FIG. 2).

The sensor unit formed above is attached to the internal organ to respond sensitively to the minute movement of the organ, but the electrical resistance value is changed by the movement of the organ in the metal layer formed on the surface of the sensor unit and the change in resistance value generated above is converted into a change in voltage value finally output, thereby monitoring the movement of the organ (see FIG. 7).

Frequency Conversion Unit

The frequency conversion unit is provided to wirelessly transmit changes in electrical resistance in the sensor unit, and according to an exemplary embodiment of the present disclosure, the frequency conversion unit may include an antenna and a tuning capacitor. In this case, the resonant frequency of the antenna may be determined by the inductance of a coil included in the antenna and the capacitance of the capacitor, and the coil may be formed in a loop shape. In addition, a core may be disposed inside the loop.

As the method of manufacturing the antenna, methods commonly known in the art may be used without particular limitation, and for example, the antenna may be manufactured by fabricating an electrode using a photolithography process, transferring the electrode to a substrate, and then depositing the capacitor on the substrate using an e-beam evaporator.

At this time, the type of the electrode is not particularly limited as long as the electrode is harmless when inserted into the body and naturally degraded, but according to an exemplary embodiment of the present disclosure, the electrode type may be magnesium (Mg) or molybdenum (Mo).

In addition, the substrate is not limited thereto, but may be selected from the group consisting of polycaprolactone (PCL), polydioxanone (PDO), poly(L-lactide) (PLLA), poly (DL-lactide-co-glycolide) (PLGA), polyethylene oxide (PEO), polylactic acid (PLA) and polyvinyl alcohol (PVA), and may preferably include PLA.

In addition, although the tuning capacitor is not limited thereto, according to an exemplary embodiment of the present disclosure, the tuning capacitor may include biodegradable silicon dioxide.

The sensor unit and the frequency conversion unit may be connected to each other using a metal wire and a conductive paste (see FIG. 3).

At this time, the type of the metal wire is not limited thereto, but may include magnesium (Mg) or molybdenum (Mo). The conductive paste may be prepared by mixing metal powder and a biodegradable polymer. The metal powder may include magnesium (Mg) or molybdenum (Mo), and the biodegradable polymer may include at least one selected from the group consisting of polybutylene adipate terephthalate (PBAT), polycaprolactone (PCL), polydioxanone (PDO), poly(L-lactide) (PLLA), poly(DL-lactide-co-glycolide) (PLGA), polyethylene oxide (PEO), polylactic acid (PLA), and polyvinyl alcohol (PVA). Preferably, the conductive paste may be prepared by uniformly mixing molybdenum powder and PCL, but is not limited thereto.

As a method of connecting the sensor unit and the frequency conversion unit, methods commonly known in the art may be used without particular limitation, and for example, the sensor unit and the frequency conversion unit may be connected to each other using the metal wire and the paste and then electrically connected to each other by annealing at 130° C. to 180° C.

The electronic device layer manufactured above may also be encapsulated using the following protective film layer. As such, since the electronic device layer is encapsulated through the following protective film layer, there is an advantage of controlling a degradation time of the electronic device layer.

As an example, the bio-adhesive device may be inserted into the body by a method of directly attaching the adhesive material layer to the surface of an internal organ to be observed, and fixing the electronic device layer to the inner wall of the body through suturing so as to be positioned as close to the outside of the body as possible. However, the present disclosure is not limited thereto, and the bio-adhesive device may be inserted by various methods according to the needs of a user.

Protective Film Layer

The adhesive device according to an aspect of the present disclosure includes a protective film layer, and the protective film layer serves to physically/chemically protect the above-described electronic device layer and control the degradation time of the electronic device layer.

According to an exemplary embodiment of the present disclosure, the protective film layer may include a porous polymer layer supported with biocompatible oil, but is not limited thereto, and the biocompatible oil may be selected from fluorine-based oils, silicone-based oils, mineral oils, and vegetable oils, that are insoluble in biological fluids.

As such, when the protective film layer includes a porous polymer layer supported with biocompatible oil, the biocompatible oil is discharged to the outside over time to form an empty space in the inner pores of the porous polymer layer. The degradation time may be controlled while inducing natural degradation of not only the protective film layer but also the electronic material layer and the adhesive material layer by infiltrating the biological fluid into the empty space formed above.

According to an exemplary embodiment of the present disclosure, the porous polymer layer may include at least one selected from the group consisting of polybutylene adipate terephthalate (PBAT), polycaprolactone (PCL), polydioxanone (PDO), poly(L-lactide) (PLLA), poly(DL-lactide-co-glycolide) (PLGA), polyethylene oxide (PEO), polylactic acid (PLA) and polyvinyl alcohol (PVA), and may preferably include PLA. These materials are biodegradable materials that are naturally degraded without inducing an immune response in the body. The protective film layer including the materials does not cause immune responses or side effects to surround tissues even after being implanted into the body, and is naturally degraded in the body, so there is an advantage that there is no need for separate removal.

The protective film layer may control the degradation time of the bio-adhesive device by adjusting the porosity of the porous polymer layer. For example, as the number of pores in the porous polymer layer increases, a large amount of biocompatible oil is discharged in a shorter period of time, and a larger amount of biological fluid is injected into the pores, thereby promoting the degradation of respective components of the bio-adhesive device. On the other hand, as the number of pores inside the porous polymer layer decreases, the discharge amount of the biocompatible oil decreases, and as a result, the amount of biological fluid injected into the pores decreases, and as a result, the degradation rate of each component of the bio-adhesive device may be controlled slowly.

According to an exemplary embodiment of the present disclosure, the porosity of the porous polymer layer may be 10% to 90%. When the porosity of the porous polymer layer is less than the range, the amount of biological fluid that may be injected into the pores inside the porous polymer layer is extremely small, so that each component of the bio-adhesive device is slightly difficult to be naturally degraded. When the range is exceeded, it may be slightly difficult to control the degradation rate of each component of the bio-adhesive device because the outflow of the biocompatible oil supported in the pores in the porous polymer layer is too fast.

In addition, the protective film layer may have an elongation of 60% or more. In this case, the bio-adhesive device including the protective film layer may be flexibly attached to a moving organ, and the attached state is continuously maintained for a certain period of time despite the moving response of the organ, so that there is an advantage in that it is easy to observe the motility of the organ. The elongation may be controlled by the presence or absence of pores, a type of biocompatible oil supported in the pores, or the like.

Antifouling Material Layer

The bio-adhesive device according to an exemplary embodiment of the present disclosure may further include an antifouling material layer in addition to the components described above.

The antifouling material layer may prevent the adhesive device of the present disclosure from adhering to the internal organs, and serve to prevent body wastes from being adsorbed to the adhesive device, and materials used in the art for antifouling purposes may be used without particular limitation.

According to an embodiment of the present disclosure, the antifouling material layer may include a squid sucker protein. The squid sucker protein is also called suckerin, as a squid sucker tooth ring (SRT: Sucker ring tooth) protein and is a protein that enables squid to strongly adhere to food or the surface to be adhered to in an underwater environment. In addition, the squid sucker protein has an advantage of excellent biocompatibility by having low immunogenicity.

<Monitoring Device>

Another aspect of the present disclosure is a monitoring device including the aforementioned bio-adhesive device and a receiver (see FIG. 4).

Receiver

The receiver is a device for detecting a signal emitted from the above-described bio-adhesive device, and any device capable of detecting the signal may be used without particular limitation, and for example, may include various electronic devices having a battery and various electronic devices that are driven by receiving power wirelessly instead of a power cable. Although not limited thereto, representative examples of the receiver may include a portable terminal, a cellular phone, a smart phone, a personal digital assistant (PDA), a portable media player (PMP), a Wibro terminal, a tablet, a phablet, a notebook, a digital camera, a navigation terminal, a television, an electric vehicle (EV), etc., but are not limited thereto. Preferably, the receiver may be manufactured using a flexible substrate (e.g., polyimide substrate, etc.) and a metal electrode (e.g., copper electrode, etc.), but is not limited thereto (see FIG. 5).

According to an exemplary embodiment of the present disclosure, signaling between the bio-adhesive device and the receiver may be performed based on Near-Field Communication (NFC), and specifically, may be performed through a resonance phenomenon of a magnetic field (see FIG. 6). The resonance phenomenon refers to a phenomenon in which when the other resonance antenna is located nearby when a near field corresponding to a resonance frequency is generated in one resonance antenna, both the resonance antennas are coupled to each other and energy transfer occurs with high efficiency between the resonance antennas. Specifically, the sensor unit in the electronic material layer detects the movement of the organ and as a result, the changes in resistance value change a resonance value generated when the antenna in the electronic material layer and the antenna in the receiver are coupled to each other. The changed resonance value passes through a matching circuit and a demodulation circuit in the receiver, and at this time, the matching circuit and the demodulation circuit convert an AC signal into a DC signal before being converted to convert the converted DC signal into an output voltage value (see FIG. 7). Accordingly, the movement of the organ may be observed in real time through the change in the final converted voltage value as described above (see FIG. 7). At this time, the resonant frequency is changeable as needed and is not particularly limited in the present disclosure, but for example, may be 5 to 50 MHz, preferably 10 to 30 MHz, and more preferably 10 to 15 MHz.

<Monitoring Method>

Another aspect of the present disclosure is a method for monitoring an internal organ using the monitoring device described above. The monitoring method of the present disclosure has an advantage of being able to sensitively detect even minute movement of the internal organ by using the monitoring device described above.

Hereinafter, preferred Examples of the present disclosure will be provided in order to facilitate understanding of the present disclosure. It will be apparent to those skilled in the art, however, that the following examples are only illustrative of the present disclosure and various changes and modifications may be made within the scope and spirit of the present disclosure, and it is natural that such variations and modifications are within the scope of the appended claims. Further, in the following examples and comparative examples, "%" and "part" representing the content are on a mass basis unless otherwise specified.

PREPARATION EXAMPLE

Preparation Example 1: Preparation of Porous Protective Film Layer

Preparation Example 1-1

Porous PLA was prepared using poly-lactic-acid (PLA, Nature works, Mw to 150,000) and N-methyl-2-pyrrolidone (NMP, Samchun Chemical). Specifically, 20 wt % of the PLA based on the total weight of the PLA and NMP was added in NMP and then completely dissolved at 120° C. to prepare a mixed solution, and the mixed solution was stored in an oven at 70° C. 4 mL of the mixed solution was sprayed on a glass plate (30 cm×30 cm), and then a thin liquid film was formed with a uniform thickness of 50 m using a doctor blade. Thereafter, the liquid film of the mixed solution and the glass plate formed with the liquid film were immersed in a solution containing distilled water as a non-solvent (see FIG. 8A) and solidified (see FIG. 8B), and the solidified porous liquid film was vacuum-dried in a desiccator at room temperature for 48 hours to prepare a porous protective film layer (see FIG. 8C).

The pores of the protective film layer prepared above were confirmed using a scanning electron microscope (SEM, jeol jsm 6610) (see FIG. 8D).

The porous protective film layer prepared as above was immersed in hydrophobic biocompatible oil (Silicon oil, Krytox, Canola oil) for 24 hours, and the hydrophobic biocompatible oil was supported in the pores of the porous protective film layer.

Preparation Example 1-2

A protective film layer was formed in the same configuration and method as Preparation Example 1-1 except for using polycarprolactone (PCL, Sigma-Aldrich) instead of PLA and using di-methyl-acetamide (DMA, Fisher Scientific) instead of NMP as a solvent.

Preparation Example 2: Preparation of Adhesive Material Layer

Preparation Example 2-1: Preparation of Adhesive Material Layer with Mussel Adhesive Protein and Acrylic Acid Crosslinked to Each Other at a Weight Ratio of 1:2

A mussel adhesive protein fp-151 of SEQ ID NO: 9 was produced in E. coli by synthesizing a fp-1 variant consisting of 6 decapeptides so that a decapeptide consisting of 10 amino acids that were repeated about 80 times in a mussel adhesive protein fp-1 naturally existed may be expressed in E. coli and inserting a Mgfp-5 gene (Genbank No. AAS00463 or AY521220) between the two fp-1 variants (D. S. Hwang et. al., Biomaterials 28, 3560-3568, 2007). Next, in the mussel adhesive protein fp-151 of SEQ ID NO: 9, tyrosine of the mussel adhesive protein was converted into DOPA through an in vitro enzymatic reaction using mushroom tyrosinase to prepare a mussel adhesive protein introduced with a catechol DOPA moiety, and this process was illustrated in FIG. 9.

Thereafter, 10 wt % of the mussel adhesive protein introduced with the DOPA moiety, 1 wt % of acrylic acid N-hydrosuccinimide ester, and α-ketoglutaric acid as a photoinitiator were dissolved to be a concentration of 0.2 wt % in deionized water, and then added and mixed with acrylic acid at a concentration of 20 wt %. The mixed solution was filtered through a 0.4 m sterile syringe filter and poured into a quartz mold. Next, the mold was cured for 1 hour with a wavelength of 254 nm and power of 10 W using an ultraviolet (UV) lamp, and then completely dried to prepare an adhesive material layer, and a dry state image of the adhesive material layer was illustrated in FIG. 10.

Preparation Example 2-2: Preparation of Adhesive Material Layer with Mussel Adhesive Protein and Acrylic Acid Crosslinked to Each Other at a Weight Ratio of 1:3

Except that the concentration of acrylic acid in Preparation Example 2-1 was 30 wt %, an adhesive material layer was prepared in the same configuration and method as in Example 1, and a dry state image of the adhesive material layer was shown in FIG. 10.

Preparation Example 2-3: Preparation of Adhesive Material Layer with Mussel Adhesive Protein and Acrylic Acid Crosslinked to Each Other at a Weight Ratio of 1:4

Except that the concentration of acrylic acid in Preparation Example 2-1 was 40 wt %, an adhesive material layer was prepared in the same configuration and method as in Example 1, and a dry state image of the adhesive material layer was shown in FIG. 10.

Preparation Example 2-4: Preparation of Adhesive Material Layer with Mussel Adhesive Protein and Acrylic Acid Crosslinked to Each Other at a Weight Ratio of 1:5

Except that the concentration of acrylic acid in Preparation Example 2-1 was 50 wt %, an adhesive material layer was prepared in the same configuration and method as in Example 1, and a dry state image of the adhesive material layer was shown in FIG. 10.

Preparation Example 3: An electronic device layer including a sensor unit and a frequency conversion unit was manufactured by depositing magnesium on the manufacturing substrate of the electronic device layer using e-beam evaporation.

Preparation Example 4: Preparation of Strain Sensor

Preparation Example 4-1: Preparation of PBAT Solution

Polybutylene adipate terephthalate (PBAT, ANKOR Bioplastics, Korea) beads were dissolved in chloroform at a weight ratio of 1:5, magnetic stirred at room temperature at a speed of 300 rpm to prepare a PBAT solution.

Preparation Example 4-2: Preparation of PBAT Substrate

The PBAT solution prepared in Preparation Example 4-1 was spin-coated on a glass substrate at 1000 rpm for 30 seconds and then left at room temperature for 1 hour. Thereafter, in order to remove fully the solvent, the substrate was thermally cured at 60° C. for 1 hour to prepare a partially transparent PBAT substrate having a thickness of 50 m.

Preparation Example 4-3: Preparation of Mo-PBAT Complex (Conductive Gel)

The PBAT solution prepared in Preparation Example 4-1 was mechanically mixed with molybdenum particles (1 to 4 m in size) at a weight ratio of 2:3 using a vortex mixer (VM-10, Daihan Scientific, Korea) to prepare a Mo-PBAT complex.

Preparation Example 4-4: Preparation of Strain Sensor

The Mo-PBAT composite conductive gel prepared in Preparation Example 4-3 was stencil-printed on the PBAT substrate prepared in Preparation Example 4-2 to print a sensor pattern, and left at room temperature overnight. Thereafter, the residual solvent was completely evaporated by drying the substrate at 60° C. for 1 hour, and in order to detect a high strain, a strain sensor having a structure as illustrated in FIG. 17 was manufactured by patterning in the form of a Kirigami structure using a $CO_2$ laser cutter.

Examples: Preparation of Bio-Adhesive Device

A bio-adhesive device including all of the components prepared in Preparation Example 1-1, Preparation Example 2-2, and Preparation Example 3 was manufactured. Specifically, the respective components were bonded by melting the surface of each component with a hot wire of 80° C., and a schematic completion diagram thereof was disclosed in FIG. 1.

Experiment Example 1: Measurement of Physical Properties of Porous Protective Film Layer of Preparation Example 1

The tensile strengths and elongations of the porous protective film layer prepared in Preparation Example 1 and a non-porous PLA protective film layer (50 m) were measured and compared using Instron, and the results were illustrated in FIG. 11. At this time, the size of the specimen used to measure the tensile strength and the elongation was 5 cm×1 cm×50 m.

The non-porous PLA protective film layer was used by processing PLA into a film having a thickness of 50 m using a hot press method.

Referring to FIG. 11, in the case of the porous protective film layer as a component of the present disclosure, it was confirmed that the tensile strength decreased and the elongation increased compared to the PLA protective film layer without pores. Through this, in the case of the porous protective film layer of the present disclosure, when attached to the internal organ, etc., due to higher flexibility, the adhesive device could be stably protected for a longer period of time despite the motility of the organ.

Experiment Example 2: Confirmation of Signaling Characteristics of Electronic Device Layer In order to confirm the signaling characteristics of the electronic device layer prepared in Preparation Example 3, an experiment was conducted by attaching the electronic device layer to the pig phantom skin having a thickness of 2 cm.

While the strain was applied to the phantom skin using a tensioner, the changed resistance value of the sensor unit and the output voltage value of the receiver were confirmed using an oscilloscope (Thermofisher Co., Ltd.), and the results were illustrated in FIG. 12.

Referring to FIG. 12, it was confirmed that a change in resistance value (left Y-axis) occurred as the strain value according to the tensioner was changed, and accordingly, it was confirmed that the output voltage value (right Y-axis) measured by the receiver was also changed. That is, it was confirmed that the resistance value and the output voltage value of the receiver varied according to the degree of strain detected by the sensor unit, and specifically, as the strain value increased, the resistance value of the sensor unit increased, and as a result, it was be confirmed that the output voltage value measured by the receiver decreased.

Experiment Example 3: Experiment for Measuring Movement of Organ

The abdomen of the mini-pig was opened as shown in FIG. 13, and then the bio-adhesive device prepared in Example was attached to the organ of the mini-pig. Thereafter, various signals generated in the organ of the mini-pig were measured as changes in output voltage using the manufactured receiver, and the results were illustrated in FIG. 14.

Specifically, referring to FIG. 14A, when movement according to respiration was measured using the bio-adhesive device of the embodiment, compared to a case where normal coupling between the bio-adhesive device and the receiver does not occur (blue), it was confirmed that the signal was generated according to the respiration cycle when coupling was normally performed (red) (peak-to-peak=40 mV). The reason why the size of the signal peaks generated from normal coupling is similar, but the offset is different may be solved through analysis that utilizes a difference in voltage between peaks, as a result of a difference due to changes (e.g., oxidation) in surrounding environment of the fabricated device.

Referring to FIG. 14B, when the bio-adhesive device of Example was applied to a mini-pig, it was confirmed that a signal with regularity may be obtained by the sensitivity of the bio-adhesive device of the present disclosure even though the movement of the organ was noticeably reduced because the pig was anesthetized. When an arbitrary physical signal is applied to an animal model to determine whether the signal obtained above is a signal caused by the movement of the organ (blue graph, gray area), it was confirmed that the device operated normally when the changed signal was read.

Experiment Example 4: Observation of Biodegradability of Bio-Adhesive Device

In Experimental Example 3, after the bio-adhesive device was attached to the internal organ of the mini-pig, the bio-adhesive device was recovered at the time of one week, and at this time, the state of the recovered bio-adhesive device was confirmed and illustrated in FIG. 16.

Referring to FIG. 15, it was confirmed that the bio-adhesive device of the present disclosure was degraded in the body.

Experiment Example 5: Cell Adhesion Test

In order to confirm the degree of cell adhesion according to a type of protective film layer, cell viability on the protective film layer was measured for various types of protective film layers, and the results were illustrated in FIG. 16.

At this time, the measurement of the cell viability was performed by applying different cell culture substrates based on a Cell Counting Kit-8 (CCK-8) method, and specific conditions other than the substrate are as follows.
[Cell Culture Conditions]
Cell type: NIH/3T3
Culture environment: 5% $CO_2$ incubator
In addition, a P type of the cell culture substrate used in each case in FIG. 16 is as follows.
[Substrate Type]
Blank: Dulbeco's Modified Eagle's Medium (DMEM)
Cell: Polystyrene (PS) for cell culture
PLA: Non-porous PLA protective film layer (prepared in the same manner as used in Experimental Example 1)
PAL/silicone oil: Coating silicon oil on non-porous PLA protective film layer (prepared in the same manner as used in Experimental Example 1)
Porous PLA: Porous PLA (prepared in the same manner as in Preparation Example 1-1 before being supported in silicone oil)
Porous PLA/silicone oil: Porous PLA in which silicone oil is supported in pores (prepared in the same manner as in Preparation Example 1-1)

Referring to FIG. 17, it was confirmed that the cell viability was the lowest on porous PLA (Preparation Example 1-1) in which silicone oil was supported on a pole, which was a configuration of the bio-adhesive material used in the Example of the present disclosure. This means that the incidence of cell adhesion is the lowest in the protective film layer of Preparation Example 1-1.

Experiment Example 6: Measurement of Change in Resistance Value According to Degree of Strain With respect to the strain sensor manufactured in Preparation Example 4-4, changes in resistance value were measured according to the degree of strain.

After the strain sensor was fixed to E3000 (Instron Co., USA), a force having a certain amount of strain was applied to measure changes in resistance value using an NI PXI-4071 module (National Instrument Inc., USA), and the results were illustrated in FIG. 18.

As illustrated in FIG. 18, it was confirmed that the resistance values of the strain sensor were changed according to a volume expansion or specific strain inside the living body, but as the degree of strain was changed within the range of 2% to 30%, the signal was measured differently.

Experiment Example 7: Biodegradability Experiment

The biodegradability of the strain sensor prepared in Preparation Example 4-4 was confirmed using electrical characteristics.

As illustrated in FIG. 19, the two terminals of the strain sensor were wire-bonded using a paste and encapsulated with polydimethylsiloxane (PDMS) to prepare a sample, and the sample was attached to a square sample disk and then fixed on a hot plate and maintained at a temperature of 37° C., and deionized water was added to the sample disk. A voltage (+5 V) was applied to the sample using a source meter (B2902A, Keysight Technologies, USA), and a change in resistance corresponding thereto was recorded, and the results were shown in FIG. 20.

As may be seen from FIG. 20, it was confirmed that after a certain period of time, the basic resistance value of the strain sensor rapidly increased and a very high resistance value was measured, which meant that the strain sensor has been degraded.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A transient bio-adhesive device comprising an adhesive material layer, an electronic device layer and a protective film layer,
   wherein the adhesive material layer comprises a mussel adhesive protein, and polyacrylic acid, and
   wherein the polyacrylic acid and the mussel adhesive protein are linked to each other by amide bonds.

2. The transient bio-adhesive device of claim 1, further comprising:
   an antifouling material layer.

3. The transient bio-adhesive device of claim 1, wherein the mussel adhesive protein is a protein in which tyrosine residues are converted into catechol compounds; a protein introduced with catechol derivatives to the surface of the mussel adhesive protein; or both thereof.

4. The transient bio-adhesive device of claim 3, wherein the catechol compound comprises at least one selected from the group consisting of 3,4-dihydroxyphenylalanine (DOPA), Dopa o-quinone, 2,4,5-trihydroxyphenylalanine (TOPA), Topaquinone, and derivatives thereof.

5. The transient bio-adhesive device of claim 1, wherein the mixing ratio of the mussel adhesive protein and the polyacrylic acid is 1:1 to 1:5 based on a weight.

6. The transient bio-adhesive device of claim 1, wherein the protective film layer comprises a porous polymer layer supported with biocompatible oil.

7. The transient bio-adhesive device of claim 6, wherein the porous polymer layer comprises at least one selected from the group consisting of polybutylene adipate terephthalate (PBAT), polycaprolactone (PCL), polydioxanone (PDO), poly (L-lactide) (PLLA), poly (DL-lactide-co-glycolide) (PLGA), polyethylene oxide (PEO), polylactic acid (PLA) and polyvinyl alcohol (PVA).

8. The transient bio-adhesive device of claim 6, wherein a porosity of the porous polymer layer is 10% to 90%.

9. The transient bio-adhesive device of claim 2, wherein the antifouling material layer comprises a squid sucker protein.

10. The transient bio-adhesive device of claim 1, wherein the electronic device layer comprises a sensor unit and a frequency conversion unit.

11. The transient bio-adhesive device of claim 10, wherein the sensor unit includes a nano-crack structure on one surface.

12. The transient bio-adhesive device of claim 10, wherein the sensor unit comprises a substrate and a metal layer.

13. The transient bio-adhesive device of claim 12, wherein the substrate includes polylactic acid (PLA).

14. The transient bio-adhesive device of claim 12, wherein the metal layer comprises magnesium (Mg) or molybdenum (Mo).

15. The transient bio-adhesive device of claim 10, wherein the frequency conversion unit comprises an antenna and a tuning capacitor.

16. The transient bio-adhesive device of claim 15, wherein the antenna comprises a magnesium (Mg) or molybdenum (Mo) electrode.

17. The transient bio-adhesive device of claim 15, wherein the tuning capacitor comprises silicon dioxide.

18. A monitoring device comprising the bio-adhesive device of claim 1 and a receiver.

19. The monitoring device of claim 18, wherein signaling between the bio-adhesive device and the receiver is based on Near-Field Communication (NFC).

20. A method for monitoring internal organs using the monitoring device of claim 18.

* * * * *